(12) United States Patent
Zaghib et al.

(10) Patent No.: US 8,765,261 B2
(45) Date of Patent: Jul. 1, 2014

(54) PROCESS FOR PREPARING CERAMIC POWDERS IN THE PRESENCE OF A SOURCE OF CARBON, POWDERS THUS OBTAINED AND THEIR USE

(71) Applicant: Hydro-Quebec, Montreal (CA)

(72) Inventors: Karim Zaghib, Longueuil (CA); Abdelbast Guerfi, Brossard (CA); Michel Armand, Saint Martin d'Uriage (FR); Patrick Charest, Saint-Julie (CA)

(73) Assignee: Hydro-Quebec, Montreal, Quebec (CA)

( * ) Notice: Subject to any disclaimer, the term of this patent is extended or adjusted under 35 U.S.C. 154(b) by 0 days.

(21) Appl. No.: 13/857,740

(22) Filed: Apr. 5, 2013

(65) Prior Publication Data

US 2013/0247863 A1 Sep. 26, 2013

Related U.S. Application Data

(60) Division of application No. 12/728,991, filed on Mar. 22, 2010, now Pat. No. 8,425,976, which is a continuation of application No. 10/516,242, filed as application No. PCT/CA03/00795 on May 27, 2003, now abandoned.

(30) Foreign Application Priority Data

May 30, 2002 (CA) ..................... 2389555

(51) Int. Cl.
*B32B 5/16* (2006.01)

(52) U.S. Cl.
USPC ........ 428/402; 427/215; 427/226; 429/218.1; 428/403

(58) Field of Classification Search
USPC ........ 427/212, 215, 226; 429/218.1; 428/402, 428/403
See application file for complete search history.

(56) References Cited

U.S. PATENT DOCUMENTS

| 5,447,708 A | 9/1995 | Helble et al. |
| 5,766,796 A | 6/1998 | Abraham et al. |
| 5,863,468 A | 1/1999 | Czubarow et al. |
| 6,153,336 A | 11/2000 | Fujimoto et al. |
| 6,387,568 B1 * | 5/2002 | Barker et al. ............. 429/218.1 |
| 6,855,273 B2 | 2/2005 | Ravet et al. |
| 7,588,826 B2 * | 9/2009 | Zaghib et al. ............. 428/403 |
| 8,425,976 B2 * | 4/2013 | Zaghib et al. ............. 427/212 |

FOREIGN PATENT DOCUMENTS

| EP | 0157366 A3 | 10/1985 |
| EP | 0313412 B1 | 4/1989 |
| EP | 0448302 A3 | 9/1991 |
| EP | 1049182 A3 | 11/2000 |
| JP | H02-180754 | 7/1990 |
| JP | 2000-302547 | 10/2000 |
| WO | WO01/53198 | * 7/2001 |
| WO | WO01/53198 A1 | 7/2001 |
| WO | 01/99215 A1 | 12/2001 |
| WO | WO02/27824 | * 4/2002 |
| WO | WO0227824 A1 | 4/2002 |

OTHER PUBLICATIONS

S Somiya et al., Handbook of Advanced Ceramics, vol. 1: Materials Science, 2003, pp. 4,7,187-189,204,226,240, Elsevier Academic Press.
K. Kinoshita, "1.2 Manufacture of Carbons for Electrochemical Applications," Carbon electrochemical and Physicochemical Properties, 1988, pp. 3-10, John Wiley & Sons, Inc., USA.
Le Petit Larousse Illustre en Couleurs, p. 218, Librairie Larousse, Paris, France.
Web page from The Center European of Ceramics, Oct. 5, 2006, http://www.cerameurop.com/english/ceramiques.htm.
Dr J Stein et al: "Mechanofusion for High Performance Particles" Process Engineering, London, GB, vol. 79, No. 4, Jan. 2002, pp. E11-E15, XP002315531.
International Search Report issued on Oct. 21, 2003, by European Patent Office in corresponding International Application No. PCT/CA03/00795 (7 pages).

* cited by examiner

*Primary Examiner* — Leszek Kiliman
(74) *Attorney, Agent, or Firm* — Buchanan Ingersoll & Rooney P.C.

(57) ABSTRACT

A method for preparing ceramic powders in the presence of a carbon powder including a step which consists in homogenizing a mixture of particles capable of resulting in a ceramic by heat treatment. Said method can be carried out in the presence of an accelerated solvent and provides, at reduced energy consumption, carbon-coated ceramic powders and then ceramics.

12 Claims, 2 Drawing Sheets

Figure 1:
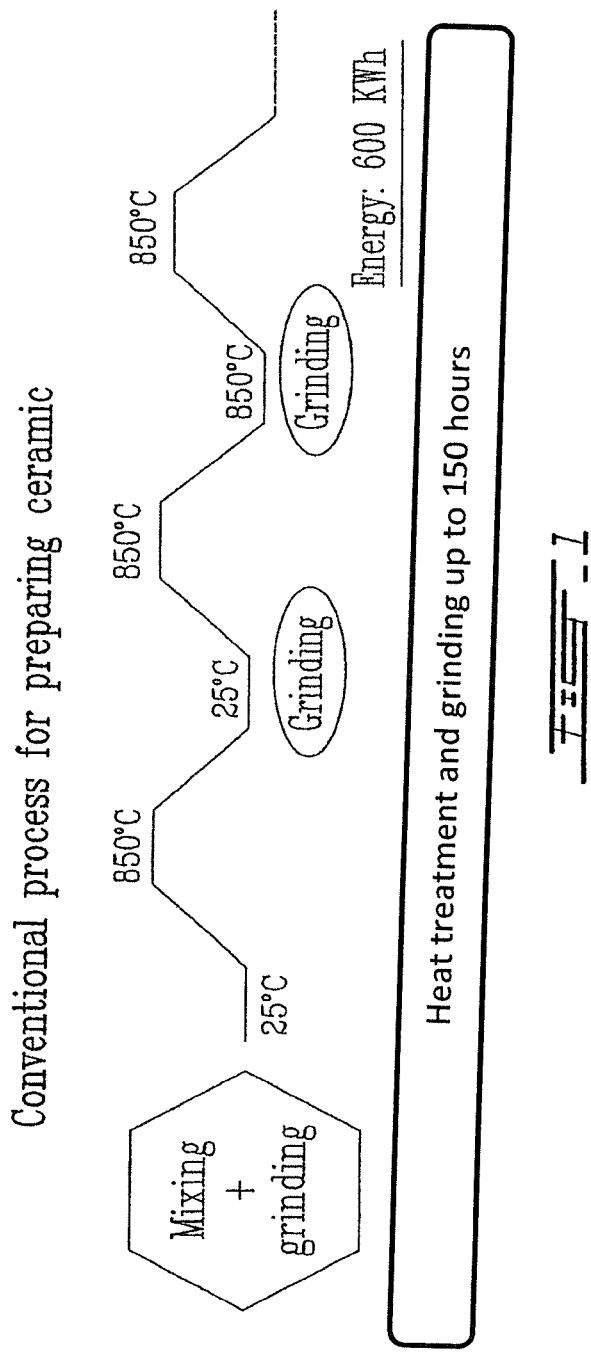

PROCESS FOR PREPARING CERAMIC POWDERS IN THE PRESENCE OF A SOURCE OF CARBON, POWDERS THUS OBTAINED AND THEIR USE

CROSS REFERENCE TO RELATED APPLICATIONS

This application is a divisional of U.S. application Ser. No. 12/728,991, filed on Mar. 22, 2010, which is a continuation of U.S. application Ser. No. 10/516,242, filed Sep. 30, 2004, which is a national stage application of International Application No. PCT/CA2003/00795, filed May 27, 2003, and claims priority to Canadian Application No. 2,389,555, filed May 30, 2002. The entire contents of each of U.S. application Ser. No. 12/728,991, U.S. application Ser. No. 10/516,242, International Application No. PCT/CA2003/00795, and Canadian Application No. 2,389,555 are hereby incorporated herein by reference in their entirety.

FIELD OF THE INVENTION

The present invention relates to a process for preparing ceramic powders in the presence carbon. This process is particularly advantageous for the preparation of ceramic powders whose average size if of the order of a nanometer, and as a preliminary step for the preparation of ceramics.

The present invention also concerns the ceramic powders and the ceramics obtained by these processes, for example conducting ceramics containing residual carbon and their use in industry.

STATE OF TECHNIQUE

Any product that is manufactured by heat treatment, for example from clays, sands, feldspaths and/or chalks is generally called ceramics.

Within the framework of the present invention, a ceramic powder designates any mixture of particles capable of giving a ceramic product after heat treatment.

As mentioned for example in part 3 of the "Grand Larousse Universel" published by Actualia, the ceramics, in plural form, are all the manufactured metals or all the products that are chemically inorganic, except for the metals and their alloys, and that are generally obtained, by high temperature treatments.

Scientific literature mentions different types of ceramics, for example traditional ceramics such as glasses, hydraulic binders (cement, lime) and sheet iron enamels. The other ceramics are usually classified in two categories, according to the nature of the cooked body used for their preparation.

Ceramics are first concerned with porous type products characterized by an earthy fracture and a permeable body, for example permeable body structural clay products which are more or less colored in red with iron oxide such as terra-cotta, varnished structural clay products, stanniferous faience, high temperature resistant refractory products, white and fine permeable bodies such as fine faience.

Ceramics are also concerned with impermeable ceramic products such as stoneware, porcelains with hard bodies, and sanitary porcelains.

Part 3 of the "Grand Larousse Universel" edited by Actualia also mentions new ceramics that correspond to a large number of categories including oxides, carbides, nitrides, borides and silicides. These products mainly obtained from powders are commonly referred to as fritted products. This category covers compounds having a binary type of physico-chemical structure, while the silicated traditional ceramics correspond for their part, to a mixture of oxides in various proportions.

Ceramics of technical types are used in the high technology sectors, such as nuclear industry, aeronautics, computer science and electronics.

Recent advances in the technology of materials have widened the field of application of ceramics to new applications based on electrical, magnetic, optical, piezoelectric, mechanical and nuclear properties, and which exploit the nature of the raw materials used, whether we are concerned with oxides or non-oxides such as carbides or nitrides, products of the chemical industry.

Formerly, clay and hydrated alumina silicate ($SiO_2$ $AlO_3$ $H_2O$) made up most of the raw material used for the manufacture of decorative ceramics, tiles, sanitary equipment and some refractory products.

Since then, the use of other natural or synthetic raw materials of the fritted alumina type, silica, silico-aluminous magnesium compounds (cordierite, mullite, steatite) was at the origin of the development of so called technical ceramics.

Thus, the use of alkali-earth metals, carbon as well as nitrogen, has made it possible to develop new phases such as oxinitrides, sialons, and carbides that are used in the state-of-the art ceramics.

The concept of raw material also called mixture of precursors has therefore widened with time. It relates to materials having undergone an extremely complex preparation.

powders (oxides, nitrides, carbides . . . ): thanks to new preparation processes, powders with controlled grading and of high chemical purity are obtained; the final product is then obtained by shaping followed by heat treatment;

monocrystalline short fibers: short fibers of the order of a few fractions of millimeter are dispersed in a matrix that may be organic, metallic or ceramic; silicon carbide wiskers are used for the production of composite materials with high mechanical resistance;

organo-metallic precursors: by thermolysis, some complex organic molecules give rise to carbides or nitrides (SiC, $Si_3N_4$ . . . ) used for example in the refractory industry to develop a product with high technicality; finally, the chemical industry has provided ceramists with molecules acting as binders or plasticizers (polyvinyl alcohol, carboxymethyl cellulose, alginate, wax . . . ) allowing access to new shaping processes, such as dry pressing, thermoplastic injection, and banded casting.

The recently developed ceramics are often qualified as fine or technical ceramics. This qualification is used because the raw material is a mineral powder shaped to produce the object, and a heat treatment is required to give it the desired characteristics.

Ceramics are poly-crystalline, polyphased materials in which the final properties of the product are conditioned by the intrinsic properties of the components. Thus, a combination of conducting grains and of insulating joints is essential for the properties associated with many ceramic components that can be used in the field of electronics.

The development of specific microstructures for example those including zirconia and reinforcing fiber, gives to the ceramics a rupture stress that compares that of metals, while preserving a clearly superior temperature resistance.

Light ceramics have been found to provide ideal materials in the field of aeronautics. On the other hand, the development of ceramics having a given porosity permits the manufacture of membranes that are highly useful in the environmental techniques and in the agri-food industry. The use of nanometric powders and of materials with composition gradients allows on its part to prepare new ceramic products.

Among the recently developed processes for the preparation of new ceramics, banded casting, isostatic pressing and injection or extrusion molding may for example be mentioned.

Moreover, the plasticity that is required for the operation of shaping the ceramics is made possible by the use of binders or plasticizers, of organic products such as waxes, cellulose or acrylic compounds, in the processes of preparing ceramics.

Recently, coagulation techniques (sol-gel) that are extremely easy to use were developed.

Finally, ceramics have the advantage of being able to be prepared in the form of thin or thick layers, and of thereby using only limited quantities of raw materials.

As used as coating, ceramics act in protecting against wear, corrosion and/or heat for example. With their specificity as electrochemical sensors, ferroelectric memories, and/or transparent electrodes, they can also be integrated in more complex systems, such as those found in electronics and microengineering.

Technical ceramics are used in all the important fields of the industrial activity as was mentioned in the publication "Les Applications", extracted from the document "Les Céramiques", edited by Le Centre Européen de la Céramique, Limoges, France.

In spite of a high level of performance associated with ceramics, their development is still relatively limited, because of the fact that the processes generally used for manufacturing ceramics are long and complex. Another one of the numerous limiting factors in the development of ceramics resides in the high energy cost that is associated with their preparation. There was therefore a need for the development of new processes for preparing ceramics with improved productivity and profitability.

IN THE DRAWINGS

FIG. 1: illustrates a conventional process for preparing ceramics, this process utilizes a succession of heat treatments and grindings of held back particles to produce the ceramic powder.

Figure 2:
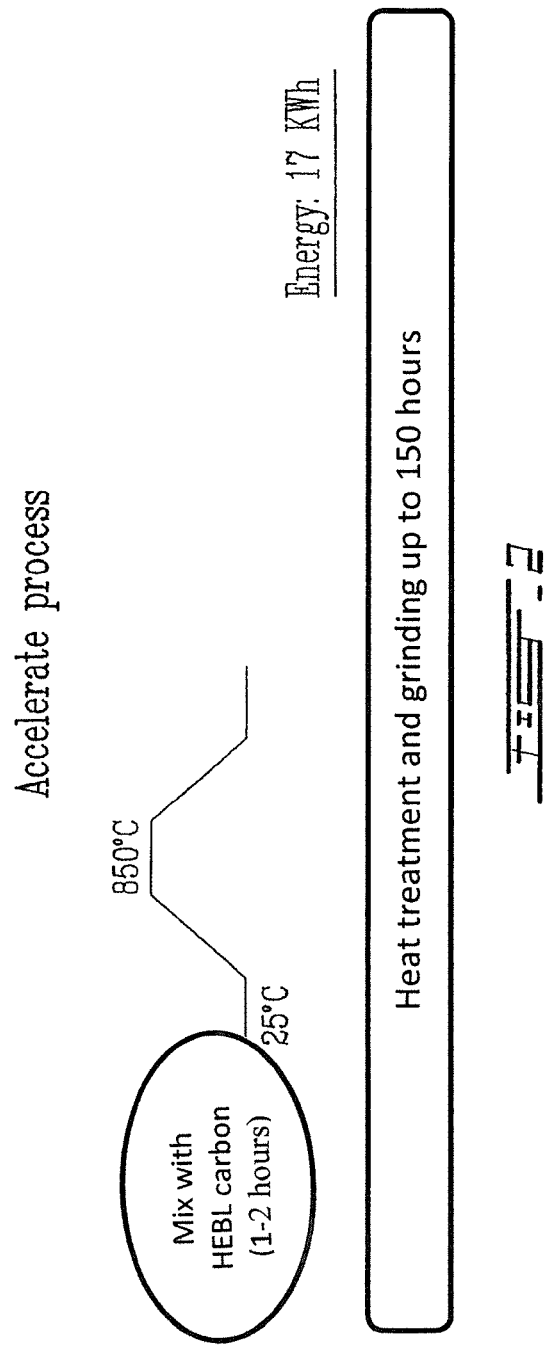

FIG. 2: illustrates an embodiment of the process according to the invention allowing an accelerated preparation of ceramic product in which the powder undergoes a limited number of sequences.

SUMMARY OF THE INVENTION

The present invention relates to a process for preparing a ceramic powder in the presence of a carbon powder, including at least one step of homogenizing the mixture of particles capable of resulting in a ceramic product by heat treatment. This accelerated process makes it possible to obtain, at a reduced energy cost, ceramic powders and ceramics.

DESCRIPTION OF THE INVENTION

A first object of the present invention resides in a process for preparing a ceramic powder from a mixture of precursors, in the presence of at least one source of carbon in liquid, solid, gaseous or heterogeneous form. The source of carbon that is used is for example in the form of particles of graphite in suspension in a hydrocarbon or in a refinery waste.

The process is advantageously carried out in the presence of a solvent that operates to disperse the precursors of the original mixture that will be subject to homogenization, and more particularly to prevent the formation of precursor agglomerates. This solvent is preferably of the organic type and is preferably selected from the group consisting of water, organic solvents and inorganic solvents. Among the organic solvents, alcohols, esters and ketones are preferred.

According to an advantageous embodiment of the invention, the source of carbon that is used for carrying out the process, is in liquid form and consists of:
  one or more hydrocarbons, preferably a mixture of hydrocarbons in liquid form at room temperature, such as refinery wastes, preferably petroleum coke or breakage coke; or
  one or more polymers having a molecular weight higher than 50,000, preferably a mixture derived from or based on oxygenated polymers such as a mixture of propylene oxide in acetonitrile.

According to an advantageous embodiment, the source of carbon in liquid form is selected from the group consisting of particles of synthetic or natural carbon, such as particles of Ketjen black, Shawinigan black or a mixture thereof.

Preferably, the source of carbon that is used in solid form has a purity greater than 50% and the impurities, if any, are preferably selected from the group consisting of sulfur, nitrogen and oxygen.

When the source of carbon is in gaseous form, it is selected from the group consisting of alkanes, alkenes, alkynes or a mixture thereof. The gaseous source is preferably a gas such as $CH_4$, $C_2H_6$, $C_2H_2$ or a mixture thereof.

The process for preparing a ceramic powder according to the invention comprises at least one of the following steps:
  a) homogenization, in the presence of the source of carbon and eventually in the presence of a solvent, to obtain an intimate mixture, preferably by grinding, more preferably by high energy grinding, of a mixture of particles that can result in ceramics by heat treatment;
  b) removal of the solvent used; and
  c) carbonization of the residual carbon that is present in the mixture obtained in step a) or b) when the source of carbon does not essentially consist of carbon, by heat treatment of said intimate mixture obtained in step a) or b).

The removal of the solvent from the intimate mixture obtained in step a) is carried out at a temperature preferably between 40 and 150 degrees Celsius, more preferably at a temperature between 60 and 120 degrees Celsius.

Introduction of the source of carbon and of the solvent is preferably carried out at the start of step a) but may also be carried out during step a).

By carrying out the process under a reducing atmosphere that is preferably formed with nitrogen, argon or a mixture thereof, it is possible to obtain particles of ceramic powder that are coated with carbon.

Advantageously, the source of solid carbon consists of particles of carbon having a size that varies between 10 and 900 nanometers and having a specific surface measured according to the BET method that is greater than 50 m²/g.

According to a particularly interesting embodiment of the process, the mixture of particles capable of resulting in ceramics by heat treatment is a mixture of particles of $ZrO_2$ and of particles of $Y_2O_3$. This mixture preferably consists of x weight percent of particles of $ZrO_2$ and (100-x) weight percent of particles of $Y_2O_3$, where x varies from 1 to 99. Still more advantageously, x is close to 50.

According to another particular embodiment of the invention, the mixture of particles capable of resulting in ceramics by heat treatment and that is used for carrying out the process, consists of particles of $Li_2CO_3$ and particles of $TiO_2$. This mixture consists of x weight percent of particles of $Li_2CO_3$ and (100−x) weight percent of particles of $TiO_2$, where x varies between 1 to 99. Even more advantageously, x is close to 50.

According to another particular embodiment, the mixture of particles capable of resulting in ceramics by heat treatment consists of particles of $Li_2CO_3$ and particles of $TiO_2$. This mixture consists of x weight percent of particles of $Li_2CO_3$ and (100−x) weight percent of particles of $TiO_2$, where x varies between 1 to 92. In this case the source of carbon preferably consists of a polyoxyethylene based polymer. This polyoxyethylene preferably has an average molecular weight of 54,000 and is advantageously dissolved, before the homogenizing step, in a aqueous or organic solvent such as acetonitrile.

For carrying out the process, the particles of the mixture that can result in ceramics preferably have a size between 1 nanometer and 10 micrometers. This size is still more advantageously between 20 and 800 nanometers.

Particularly advantageous results are obtained when carrying out the preparation process with particles of $ZrO_2$, $Y_2O_3$, $TiO_2$ or $Li_2TiO_3$ whose size varies between 1 and 10 microns.

Among carbon powders, those having a size distribution characterized by a D50 between 10 nanometers and 10 micrometers, more particularly those having a D50 between 100 nanometers and 2 micrometers should be particularly mentioned.

When the powder from the source of carbon consists of a polymer or a hydrocarbon in powder form, the corresponding powders with a D50 of 10 to 500 nanometers, preferably those with a D50 that varies between 100 and 200 nanometers are considered advantageous.

With respect to the particles of the source that can result in ceramics by heat treatment, those having a size distribution characterized by a D50 between 10 nanometers and 10 micrometers are preferred. Those having a D50 between 100 nanometers and 2 micrometers are particularly interesting.

Generally, interesting results are obtained when the various particles used in the process have substantially similar granulometry, and more particularly those being characterized by D50 lower than or equal to 1 micrometer.

When homogenization is carried in step a) of the process under dry conditions, an Aglomaster mixer of HOSOKAWA is preferably used. When homogenization is carried out in step a) under wet conditions, a mechano-fusion device of KOSOKAWA, Japan, is advantageously used. Particularly for mixers of the Aglomaster type the homogenization speed is preferably between 1500 and 3000 rpm.

Step a) generally lasts between 1 and 3 hours. Preferably step a) lasts about 2 hours.

On the other hand, step c) lasts 2 to 24 hours. Preferably step c) lasts about 3 hours.

According to an advantageous embodiment of the invention, the steps are carried out under an inert atmosphere, in order that carbon remains in the final product, preferably under nitrogen or argon, or under a mixture thereof. Otherwise, carbon is oxidized and removed by evaporation, as carbon dioxide.

In the case where it is desired to remove any trace of residual carbon from the ceramic powder that is obtained at the end of the process, at least one step of the process is then carried out in the presence of a source of oxygen such as air or pure oxygen. This precaution is necessary in particular in the case where the presence of residual carbon could be harmful to the quality of the ceramics that one intends to prepare from this powder.

The source of carbon may in part be in liquid and/or gaseous form.

According to an advantageous embodiment of step b) removal of the solvent is carried out at a temperature between 200 and 500 degrees Celsius, and more preferably at a temperature of about 400 Celsius. This heat treatment for its part advantageously lasts between 12 and 24 hours, and preferably about 20 hours.

According to a preferred embodiment of the present invention, the carbonization step is carried out in the reactor that was used to carry out homogenization of the mixture that can result in ceramics by heat treatment.

The preparation process according to the invention allows for example to obtain a ceramic powder whose particles have a size dimension between 10 nanometers and 1 micron. The size of the particles of the ceramic powder obtained is advantageously between 50 and 500 nm.

In homogenization step a), the temperature is advantageously set between 20 and 40° Celsius, more preferably this temperature is about 25° C.

In carbonizing step b), the temperature is advantageously set between 700 and 1200° Celsius, more preferably this temperature is about 1100° C.

Advantageously, the amount of carbon source used in the process represents 2 to 10 weight percent, preferably 6 weight percent of the mixture of particles that can result in a ceramic product by heat treatment.

Preferably, the source of carbon is a polymer and the amount of polymer used represents from 5 to 30 weight percent, preferably about 20 weight percent, more preferably about 10 weight percent of the mixture of particles that can result in a ceramic product by heat treatment.

In the particular embodiment in which a powder mixture of $Y_2O_3$ and $ZrO_2$ is used for the preparation of the ceramic powder, the quantity of $Y_2O_3$ in the mixture of particles subjected to grinding varies between 5 and 15% and the quantity of $ZrO_2$ varies between 5 to 15 weight percent.

The preparation process according to the present invention advantageously makes it possible to obtain a ceramic powder having at the end of step b) or at the end of step c) a nano type structure, more preferably the size of the ceramic particles thus obtained is between 10 and 900 nanometers.

A second object of the present invention consists in ceramic powders capable of being obtained by one of the processes that are the object of the present invention. These powders are for example characterized by a homogenous size distribution and/or a residual carbon content of between 0.05 and 10%.

A third object of the present invention consists in a process for preparing a ceramic product including the steps of preparing a ceramic powder, that are defined within the framework of the first object of the invention as well as a final step in which the ceramic powder that is obtained is subjected to, according to a usual mode of transformation of the ceramic powders into a ceramic powder, at least one heat treatment at a temperature higher than 800° Celsius, for a period of time that is preferably comprised between 3 and 24 hours.

A fourth object of the present invention consists in a ceramic product capable of being obtained by the process according to the third object of the present invention. Among these ceramic products, those containing residual carbon are particularly interesting for their conductivity.

A fifth object of the present invention is constituted by the use of a powder or a ceramic product according to the invention in the field of fuel batteries or in the field of automobile, more particularly in the preparation of piston heads.

These powders and ceramic products are also advantageously used for the preparation of anodes or ceramic electrolytes and those deprived of residual carbon are advantageously used in the manufacture of electric insulators.

DESCRIPTION OF PREFERRED EMBODIMENTS OF THE INVENTION

The process for preparing a ceramic powder according to the present invention is advantageously carried out in two steps as illustrated in FIG. 2.

The first step for preparing a ceramic powder consists for example in preparing a powder in the presence of carbon from a mixture preferably of $ZrO_2$ and $Y_2O_3$, by high energy mechanical grinding preferably during 1 to 2 hours, until the mixture becomes intimate.

The second step for preparing a ceramic product consists in heating a powder obtained in the first step, preferably at a temperature of 850° C., preferably during 3 hours. The ceramic powder thus obtained is a nanometric powder. The formation of the ceramic product is confirmed by X ray diffraction.

This process is simple to operate due to the fact that it includes only two steps, moreover these steps are short and require only a small energy input. Finally, another advantage, the nano form is obtained after only 5 hours.

Moreover, the energy required for the manufacture of a ceramic powder is negligible, i.e. about 17 KWh, as illustrated in FIG. 2 annexed hereto.

The process for preparing a ceramic product according to the present invention includes a step of producing the ceramic product during which the ceramic powder obtained is heat treated at a temperature higher than 800° C.

EXAMPLES

The following examples are given purely by way of illustration and should not be interpreted as constituting any limitation of the invention.

Conventional Process for Preparing a Ceramic Product

FIG. 1 annexed hereto illustrates one of these processes of manufacturing a ceramic product in a plurality of grinding and heat treatment steps. The duration of such a process is about 150 hours, the energy used for the preparation of about 1 kg of ceramic product is of the order of 600 kWh, which involves non-negligible production costs.

Example 1

Dry Preparation of a Ceramic Powder Comprising Particles of $LiTi_2O_4$ Coated with Carbon Preliminary Step of Preparing a Powder of $Li_2TiO_3$ This step consists in mixing 20 grams of a $TiO_2$ powder of a particle size of 20 nanometers, with anatase structure (from Kronoss, in Varennes—Canada) with 18.5 g of a $Li_2CO_3$ powder of a particle size of 500 nanometers (marketed by Aldrich, Canada).

After an intimate homogenization by co-grinding during 1 hour, a powder with fine grading is obtained. This co-grinding is carried out by heating in two consecutive steps, at 400° C., then at 750° C., respectively during 1 and 10 hours. A product (A) consisting of $Li_2TiO_3$ of stoichiometric structure is then obtained.

Preparation of $LiTi_2O_4$

In this second step, a mixture (B) consisting of 10 grams of product (A) of formula $Li_2TiO_3$, obtained in the preliminary step, is mixed with 10.8 grams of $TiO_2$, 19.4 grams of $Ti_2O_3$ (Aldrich, Canada) and 2.4 grams of Shawinigan carbon black.

After an intimate grinding during 1 hour at room temperature, a fine grading powder is obtained. The mixture obtained is again reheated under argon during 15 hours.

The final product is a ceramic powder of a $LiTi_2O_4$ type structure.

Example 2

Dry Preparation of $LiTi_2O_4$ Particles Coated with a Polymer Induced Carbon

This preparation is carried out similarly as in example 1, except that the source of solid carbon is replaced by a POE based polymer, i.e. by a polyoxyethylene of average molecular weight 900,000. The polymer is dissolved in an excess of water and then mixed with composition (B) without carbon.

The weights of the different powders used are the same as in example 1 and the weight of the polymer is 25 grams. The mixture is first dried at 120° C. during 24 hours. After an intimate grinding during 1 hour, a powder with fine grading is obtained. The mixture obtained is again reheated under argon during 15 hours. The final product has a $LiTi_2O_3$ type structure.

Example 3

Preparation of Ceramic Products

By heating the ceramic powders obtained in examples 1 and 2, at a temperature higher than 750 degrees Celsius and during more than 15 hours, a ceramic product is obtained.

Although the present invention has been described by means of specific embodiments, it is understood that many variations and modifications may be associated with said embodiments, and the present invention aims at covering such modifications, uses or adaptations of the present invention following in general, the principles of the invention and including any variation of the present description that will become known or conventional in the field of activity of the present invention, and that may apply to the essential elements mentioned above, in accordance with the scope of the following claims.

The invention claimed is:

1. Ceramic powder obtained by a process comprising:
   i) preparing a ceramic powder from a mixture of precursors of said powder and in the presence of at least one source of carbon, by a method comprising the following steps:
      a) homogenization, in the presence of the source of carbon and optionally in the presence of a solvent, to obtain an intimate mixture of precursor particles that can result in a ceramic product by heat treatment;
      b) removal of the solvent eventually if present in the intimate mixture obtained in step a);
      wherein the source of carbon is in solid form and is synthetic or natural carbon particles, or a mixture thereof,
      wherein the homogenization step a) is carried out by mechanofusion
   ii) subjecting the ceramic powder to at least one heat treatment at a temperature higher than 800° C.

2. Ceramic powder according to claim 1, consisting of particles of $LiTi_2O_4$ coated with carbon.

3. Ceramic powders according to claim 1, wherein the process is carried out at least partially under a reducing atmosphere, said reducing atmosphere preventing transformation of the carbon, that is present in the reaction mixture, into carbon dioxide, and allowing to obtain particles of ceramic powder that are coated with carbon.

4. Ceramic powders according to claim 1, wherein the process is carried out under inert atmosphere.

5. An electrical ceramic insulator comprising a ceramic powder according to claim 4.

6. A fuel battery or automobile comprising a part, the part comprising a ceramic powder according to claim 1.

7. The fuel battery or automobile according to claim 6, wherein the part is a piston head.

8. The fuel battery or automobile according to claim 6, wherein the part is a ceramic anode or a ceramic electrolyte.

9. A fuel battery or automobile comprising a part, the part comprising a ceramic powder according to claim 2.

10. A fuel battery or automobile comprising a part, the part comprising a ceramic powder according to claim 3.

11. Ceramic powders obtained by carrying out a process for the preparation of a ceramic powder from a mixture of precursors of said powder and in the presence of at least one source of carbon, comprising the following steps:
   a) homogenization, in the presence of the source of carbon and optionally in the presence of a solvent, to obtain an intimate mixture of precursor particles that can result in a ceramic product by heat treatment;
   b) removal of the solvent if present in the intimate mixture obtained in step a);
   wherein the source of carbon is in solid form and is synthetic or natural carbon particles, or a mixture thereof,
   wherein the homogenization step a) is carried out by high energy grinding,
   wherein the mixture of particles that can result in a ceramic product by heat treatment, is a mixture of particles of $ZrO_2$ and particles of $Y_2O_3$.

12. Ceramic powders obtained by carrying out a process for the preparation of a ceramic powder from a mixture of precursors of said powder and in the presence of at least one source of carbon, comprising the following steps:
   a) homogenization, in the presence of the source of carbon and optionally in the presence of a solvent, to obtain an intimate mixture of precursor particles that can result in a ceramic product by heat treatment;
   b) removal of the solvent if present in the intimate mixture obtained in step a);
   wherein the source of carbon is in solid form and is synthetic or natural carbon particles, or a mixture thereof,
   wherein the homogenization step a) is carried out by high energy grinding,
   wherein the mixture of particles that can result in a ceramic product by heat treatment is a mixture of particles of $Li_2TiO_3$ and of particles of $TiO_2$.

* * * * *